United States Patent Office 3,305,455
Patented Feb. 21, 1967

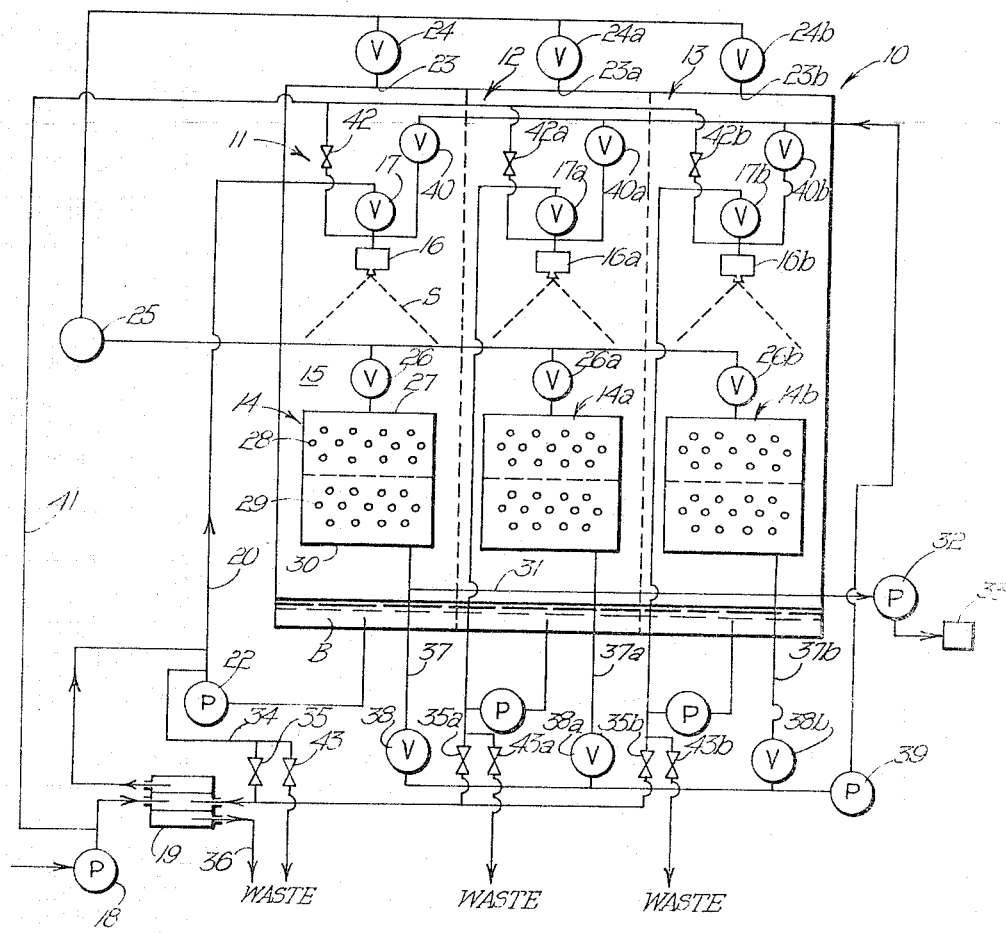

3,305,455
METHOD OF SCALE CONTROL IN SEA WATER EVAPORATION
Frederick A. Loebel, Milwaukee, Wis., assignor to Aqua-Chem, Inc., a corporation of Wisconsin
Filed Feb. 6, 1963, Ser. No. 256,581
1 Claim. (Cl. 203—7)

This invention relates to fluid processing and in particular to a method of eliminating scale formed in the process of evaporation of sea water as for producing fresh water therefrom.

In the conventional evaporators provided for forming fresh water from sea water and the like, scale tends to form on the heat exchanger surfaces requiring costly and time consuming removal operations at periodic intervals. Conventionally, the operation of such evaporators has been controlled to utilize combinations of pressure, temperature and brine concentration to cause the scale which forms to be an acid-removable scale, such as magnesium hydroxide and calcium carbonate scale. The pressure, temperature and brine concentration combinations which would tend to produce acid-insoluble scale, such as calcium sulphate scale, have been carefully avoided as such scale cannot be removed by the normal cleaning acids.

While magnesium hydroxide and calcium carbonate are readily insoluble in water, calcium sulphate scale is relatively soluble in water. The present invention comprehends the utilization of these characteristics of calcium sulphate, magnesium hydroxide and calcium carbonate scales to provide a novel method of eliminating scale formed in the process of sea water evaporation.

Thus, a principal feature of the present invention is the provision of a new and improved method of eliminating scale formed in the process of evaporation of sea water.

Another feature of the invention is the provision of such a method comprising the steps of evaporating the sea water by heating the same to a preselected temperature and pressure to cause formation of scale in which the major constituents are substantially more soluble in water than calcium carbonate and magnesium hydroxide, and dissolving the formed scale in water and/or dissolving the water soluble constituents so as to cause a mechanical disintegration of the water insoluble constitutents.

Another feature of the invention is the provision of such a method of scale elimination wherein the major portion of the scale formed is calcium sulphate scale.

A further feature of the invention is the provision of such a method of eliminating scale wherein the condensate obtained from the evaporated sea water is used for dissolving the formed calcium sulphate scale.

Other features and advantages of the invention will be apparent from the following description taken in connection with the accompanying drawing wherein the figure is a schematic flow diagram of a system for evaporating sea water illustrating a method embodying the invention of eliminating scale formed during the evaporation process.

In the exemplary embodiment of the invention as disclosed in the drawing, an evaporator generally designated 10 is shown to include stages 11, 12 and 13. As shown, the evaporator may comprise a horizontal long tube spray film evaporator in which each stage includes a two-phase tube bundle structure 14 disposed in the lower portion of a chamber 15 and over which the seat water S is sprayed from a superposed spray head 16. The sea water is delivered to the spray device 16 through a valve 17 from a sea water feed pump 18 through a heat exchanger 19 and through a feed conduit 20. The brine B is recirculated from the bottom of chamber 15 through a brine recirculating pump 22 which delivers it to the feed conduit 20.

The vapor formed by the heat exchange from the tube bundle 14 to the film of sea water sprayed thereon passes upwardly from chamber 15 through an outlet 23. The vapor is delivered through a valve 24 to a steam compressor 25 having its output connected through a valve 26 to an inlet header 27. The compressed vapor or steam passes through the tubes 28 in the upper portion of tube bundle 14 and then returns through tubes 29 in the lower portion of the tube bundle 14 to an outlet header 30 connected through a conduit 31 to a condensate pump 32 which delivers the condensate as desired, such as to a storage tank 33. To provide preheating of the incoming feed water, a portion of the brine B flowing from the lower portion of chamber 15 to pump 22 is diverted through a conduit 34 including a control valve 35 to the heat exchanger 19 and thence to a suitable discharge 36, which in the case of a marine installation of the apparatus would be overboard.

Thus, in normal operation, the feed sea water is caused to evaporate within chamber 15 by virtue of the heat exchange from tube bundles 14 as controlled by the temperature and pressure conditions within the evaporator. The pressure is maintained within the chamber 15 by virtue of the heat transfer forming the vapor and by the compression of the vapor by the pump 25 which under normal operating conditions of the evaporator maintains the pressure and, therefore, the temperature within chamber 15 at a preselected substantially constant value.

Heretofore, in such vapor compression evaporator systems, the pressure and temperature have been preselected to prevent the formation of non-acid soluble scale. Illustratively, in the conventional apparatus where the brine concentration is approximately 70,000 p.p.m. such evaporators have been operated at approximately 15 p.s.i.a. and at approximately 215° F. In practicing the present invention, however, the apparatus is caused to function under correlated pressure and temperature conditions which, rather than precluding the formation of the non-acid soluble scale, causes a major portion of the scale formed to be other than the conventional acid soluble scales. More specifically, where the feed is brackish or saline sea water, evaporation has heretofore been carried out at pressure and temperature conditions causing the major constituents of the scale to be magnesium hydroxide and calcium carbonate. In practicing the present invention, the major constituent of the scale formed is calcium sulphate scale and only a small portion of the scale comprises magnesium hydroxide and calcium carbonate scale.

The preferred operating temperatures are above approximately 170° F. Illustratively, in practicing the invention in the production of fresh water from sea water the pressure may be 15 p.s.i.a., and the temperature may be approximately 215° F. where the brine concentration is approximately 100,000 p.p.m.

As the calcium sulphate scale is soluble in sea water or the fresh water which comprises the condensate delivered from the tube bundles 14, such water may be used to effect the scale removal. Thus, as shown in the drawing, a branch conduit 37 is connected to conduit 31 and is controlled by a valve 38 for delivering condensate fresh water through a pump 39 and a second valve 40 to the spray device 16. Alternatively, cold sea water may be used, being delivered from pump 18 through a conduit 41 provided with a control valve 42 to the spray device 16 for washing the scale from the tube bundles 14. The brine may be delivered to a suitable discharge, such as overboard in a marine installation, by means of a control valve 43 connected to conduit 34.

The dissolving of the calcium sulphate scale effects the descaling operation both by elimination of this scale itself and by causing any water insoluble scales deposited with the water soluble scale to be mechanically broken up as a result of the disintegration of the water soluble scale as it dissolves into the wash water. Thus, improved descaling is obtained as a result of the simplified removal of the water soluble and water insoluble scales.

As shown in the drawing, the evaporator 10 may include three stages, stages 12 and 13 being identical to stage 11. For simplification of the description of the apparatus, elements of stage 12 corresponding to elements of stage 11 are identified by similar reference numerals, but having a suffix $a$, and elements of stage 13 similar to elements of stage 11 are identified by similar reference numerals having a suffix $b$. In the normal operation of apparatus 10, therefore, two of the stages may be functioning in the evaporation cycle, while the third stage is functioning in the scale removing cycle. Illustratively, a sixteen-hour evaporation cycle may be combined with an eight-hour scale removing cycle to provide continuous evaporation operation of two-thirds of the apparatus 10. Stage 11, for example, may be operated in the evaporation cycle from midnight to 4:00 p.m. and washed from 4:00 p.m. to the following midnight. Stage 12 may be operated in the evaporation cycle from 8:00 a.m. to the following midnight, having been operated in the wash cycle from the preceding midnight to 8:00 a.m. Stage 13 may be operated in the evaporation cycle from midnight to 8:00 a.m., in the wash cycle from 8:00 a.m. to 4:00 p.m., and in the evaporation cycle from 4:00 p.m. to the following midnight. Thus, changes in the operation cycles of the stages may be correlated with shift changes to facilitate the surveillance and control of the apparatus.

Thus, the present invention comprehends an improved method of scale removal in an evaporator apparatus permitting improved efficiency of operation of the evaporator and simplified maintenance thereof. The invention substantially reduces the need for cleaning acids and the like, and permits extended continuous operation of the evaporator apparatus.

While I have shown and described one embodiment of my invention, it is to be understood that it is capable of many modifications. Changes, therefore, in the construction and arrangement may be made without departing from the spirit and scope of the invention as defined in the appended claim.

I claim:

The method of eliminating the formation of water insoluble scale containing magnesium hydroxide and calcium carbonate as the major constituents formed in the process of evaporation of sea water, comprising the steps of forming a water soluble scale containing water soluble calcium sulphate as the major constituent and only a small portion of water insoluble magnesium hydroxide and calcium carbonate by evaporating the sea water on a hot surface to the point of the scale formation resulting from heating a film of the sea water on the hot surface to a temperature of about 215° F. and at a pressure of about 15 p.s.i.a. to a brine concentration of about 100,000 p.p.m. and thereby forming water soluble scale on the hot surface, condensing the evaporated water to form and store fresh water condensate, interrupting the evaporation step while washing the scale on said surface with the fresh water condensate until the water soluble calcium sulphate is dissolved in the fresh water condensate and the water insoluble scale constituent is mechanically broken up and both the water soluble and water insoluble constituents are removed with the fresh water condensate.

References Cited by the Examiner

UNITED STATES PATENTS

| | | | |
|---|---|---|---|
| 14,230 | 2/1856 | Everett | 122—379 X |
| 1,686,715 | 10/1928 | Smith | 210—56 |
| 2,352,069 | 6/1944 | Beline. | |
| 2,756,035 | 7/1956 | Axelrad et al. | |
| 3,026,261 | 3/1962 | Mayfield et al. | 210—56 |
| 3,041,274 | 6/1962 | Love et al. | 210—56 |

OTHER REFERENCES

Report N. 49, U.S. Dept. of Interior: An Investigation of the Use of Acoustic Vibrations to Improve Heat Transfer Rates and Reduce Scaling in Distillation Units Used for Saline Water Conversion; March 1961, particularly pages 83 and 140 and 141.

Water Softening and Purification, Collet, 1896, London, E. & F. N. Spon, New York, Spon & Chamberlain, pages 15–55.

Water Treatment—For Industrial and Other Uses, Nordell, 1951, Reinhold Publishing Corp., New York, pages 189–193 and 207–218 relied on.

NORMAN YUDKOFF, *Primary Examiner.*

MORRIS O. WOLK, *Examiner.*

M. E. ROGERS, J. B. DONIHEE, *Assistant Examiners.*